US009219836B2

(12) United States Patent
Bouverie et al.

(10) Patent No.: US 9,219,836 B2
(45) Date of Patent: Dec. 22, 2015

(54) SENSING APPARATUS FOR DETECTING AND DETERMINING THE WIDTH OF MEDIA ALONG A FEED PATH

(75) Inventors: William M. Bouverie, Windermere, FL (US); Mark Allen Hitz, Rock Hill, SC (US); Dwayne Steven Tobin, Longwood, FL (US); Richard Hatle, Oviedo, FL (US)

(73) Assignee: Datamax-O'Neil Corporation, Orlando, FL (US)

( * ) Notice: Subject to any disclaimer, the term of this patent is extended or adjusted under 35 U.S.C. 154(b) by 145 days.

(21) Appl. No.: 13/478,229

(22) Filed: May 23, 2012

(65) Prior Publication Data
US 2012/0301202 A1 Nov. 29, 2012

Related U.S. Application Data

(60) Provisional application No. 61/488,890, filed on May 23, 2011.

(51) Int. Cl.
*B65H 9/04* (2006.01)
*B65H 1/00* (2006.01)
*H04N 1/00* (2006.01)

(52) U.S. Cl.
CPC ............. *H04N 1/00689* (2013.01); *B65H 9/04* (2013.01); *H04N 1/0071* (2013.01);
(Continued)

(58) Field of Classification Search
CPC ......... G03G 15/00; G03G 21/00; B65H 1/00; B65H 9/00; B65H 9/04; B65H 2403/441; B65H 2404/742; B65H 2511/12; B65H 2511/22; B65H 2553/414; B65H 2801/06; H04N 1/00689; H04N 1/0071; H04N 1/00732; H04N 1/00734; H04N 1/00755; H04N 1/00771; H04N 1/00779
USPC ................... 399/389, 393; 271/9.06; 400/619
See application file for complete search history.

(56) References Cited

U.S. PATENT DOCUMENTS 4,143,977 A  3/1979 Kurihara et al.
4,177,731 A  12/1979 Kleist et al.
(Continued)

FOREIGN PATENT DOCUMENTS

JP  58130832 A  *  8/1983  ............... B65H 1/04
JP  58158074 A  *  9/1983  ............. G11B 19/12
(Continued)

OTHER PUBLICATIONS

Written Opinion of the International Searching Authority, PCT/US2012/036297, Jul. 17, 2012.
(Continued)

*Primary Examiner* — Nguyen Ha
(74) *Attorney, Agent, or Firm* — Additon, Higgins & Pendleton

(57) ABSTRACT

A system to determine the presence and width of a media within a printing system is disclosed which includes a pair of adjustable media guides is provided about a carriage and is axially spaced apart along the length of the carriage. The guides may be manipulated along a horizontal axis in a sliding, synchronized manner and such that the center line of media is maintained along the centerline of the print station. A sensor is provided and affixed to the carriage, the sensor being operable for emitting an optical signal through an aperture located in the carriage. At least one of the guides includes an obstruction which may protrude into the path of the optical signal at defined locations. As the guides move about the horizontal axis, the obstruction may block or otherwise interrupt the optical signal, thereby signaling the sensor and the printer of the media's presence and width.

18 Claims, 3 Drawing Sheets

(52) U.S. Cl.
CPC ...... *H04N 1/00732* (2013.01); *H04N 1/00734* (2013.01); *H04N 1/00755* (2013.01); *H04N 1/00771* (2013.01); *H04N 1/00779* (2013.01); *B65H 2403/411* (2013.01); *B65H 2404/742* (2013.01); *B65H 2511/12* (2013.01); *B65H 2511/22* (2013.01); *B65H 2553/414* (2013.01); *B65H 2801/06* (2013.01)

(56) References Cited

U.S. PATENT DOCUMENTS

| | | | |
|---|---|---|---|
| 4,788,558 A | 11/1988 | Caldwell et al. | |
| 4,788,559 A | 11/1988 | Ende | |
| 4,872,659 A | 10/1989 | Kato et al. | |
| 4,924,240 A | 5/1990 | Herbert et al. | |
| 4,949,134 A * | 8/1990 | Iwaki et al. | 399/402 |
| 4,991,846 A | 2/1991 | Sondej | |
| 5,028,155 A | 7/1991 | Sugiura et al. | |
| 5,087,137 A | 2/1992 | Burnard et al. | |
| 5,126,580 A * | 6/1992 | Hiraoka et al. | 250/559.15 |
| 5,206,662 A | 4/1993 | Fox et al. | |
| 5,326,182 A | 7/1994 | Hagstrom | |
| 5,397,192 A | 3/1995 | Khormaee | |
| 5,468,076 A | 11/1995 | Hirano et al. | |
| 5,490,638 A | 2/1996 | Driftmyer et al. | |
| 5,564,841 A | 10/1996 | Austin et al. | |
| 5,573,236 A * | 11/1996 | Petocchi et al. | 271/265.02 |
| 5,574,551 A | 11/1996 | Kazakoff | |
| 5,600,350 A | 2/1997 | Cobbs et al. | |
| 5,650,730 A | 7/1997 | Herbst, Jr. | |
| 5,684,516 A | 11/1997 | Cseledy et al. | |
| 5,710,634 A * | 1/1998 | Kuriyama et al. | 358/296 |
| 5,790,162 A | 8/1998 | Adams et al. | |
| 5,820,280 A | 10/1998 | Fox | |
| 5,836,704 A | 11/1998 | Lau et al. | |
| 5,870,114 A | 2/1999 | Numata et al. | |
| 5,872,585 A | 2/1999 | Donato et al. | |
| 5,874,980 A | 2/1999 | West | |
| 5,909,233 A | 6/1999 | Hamman et al. | |
| 5,927,875 A | 7/1999 | Lau et al. | |
| 5,978,004 A | 11/1999 | Ehrhardt | |
| 5,995,128 A | 11/1999 | Adams et al. | |
| 6,014,229 A | 1/2000 | Yun | |
| 6,020,906 A | 2/2000 | Adams et al. | |
| 6,034,708 A | 3/2000 | Adams et al. | |
| 6,057,870 A | 5/2000 | Monnier et al. | |
| 6,070,048 A | 5/2000 | Nonaka et al. | |
| 6,073,925 A * | 6/2000 | Sato | 271/171 |
| 6,082,914 A | 7/2000 | Barrus et al. | |
| 6,095,704 A | 8/2000 | Jaeger et al. | |
| 6,099,178 A | 8/2000 | Spurr et al. | |
| 6,129,463 A | 10/2000 | Lau et al. | |
| 6,201,255 B1 | 3/2001 | Torchalski et al. | |
| 6,246,859 B1 | 6/2001 | Takemura | |
| 6,283,024 B1 | 9/2001 | George | |
| 6,289,730 B1 | 9/2001 | Elgee | |
| 6,302,604 B1 | 10/2001 | Bryant et al. | |
| 6,389,241 B1 | 5/2002 | Cernusak et al. | |
| 6,396,070 B1 | 5/2002 | Christensen et al. | |
| 6,520,614 B2 | 2/2003 | Kaneko | |
| 6,609,844 B1 * | 8/2003 | Petteruti et al. | 400/88 |
| 6,616,362 B2 | 9/2003 | Bouverie et al. | |
| 6,695,500 B2 * | 2/2004 | Kim et al. | 400/613 |
| 6,825,864 B2 | 11/2004 | Botten et al. | |
| 6,840,689 B2 | 1/2005 | Barrus et al. | |
| 6,846,121 B2 | 1/2005 | Bouverie et al. | |
| 6,857,714 B2 | 2/2005 | Hohberger et al. | |
| 6,900,449 B2 | 5/2005 | Bolash et al. | |
| 6,942,403 B2 | 9/2005 | Hohberger et al. | |
| 7,042,478 B2 | 5/2006 | Bouverie et al. | |
| 7,071,961 B2 | 7/2006 | Ullenius et al. | |
| 7,079,168 B2 | 7/2006 | Ullenius et al. | |
| 7,150,572 B2 | 12/2006 | McNestry et al. | |
| 7,162,460 B2 | 1/2007 | Cleckler et al. | |
| 7,205,561 B2 | 4/2007 | Chelvayohan et al. | |
| 7,255,343 B2 | 8/2007 | So | |
| 7,375,832 B2 | 5/2008 | Bouverie et al. | |
| 7,456,995 B2 | 11/2008 | Stephens | |
| 7,502,042 B2 | 3/2009 | Hitz et al. | |
| 7,537,404 B2 | 5/2009 | Bouverie et al. | |
| 7,600,684 B2 | 10/2009 | Tobin et al. | |
| 7,667,874 B2 | 2/2010 | MacDonald et al. | |
| 7,699,550 B2 | 4/2010 | Bouverie et al. | |
| 7,824,116 B2 | 11/2010 | Lyman | |
| 7,845,632 B2 | 12/2010 | Windsor et al. | |
| 7,857,414 B2 | 12/2010 | Eun et al. | |
| 7,876,223 B2 | 1/2011 | Yamaguchi et al. | |
| 7,891,892 B2 | 2/2011 | Chiu | |
| 7,907,159 B2 | 3/2011 | Matsuo et al. | |
| 7,918,452 B2 * | 4/2011 | Fuchi | 271/240 |
| 7,934,881 B2 | 5/2011 | Lodwig et al. | |
| 7,938,501 B2 | 5/2011 | Takamiya et al. | |
| 8,142,087 B2 | 3/2012 | Kugimachi | |
| 2001/0008612 A1 | 7/2001 | Liljestrand et al. | |
| 2003/0081024 A1 | 5/2003 | Vives et al. | |
| 2003/0141655 A1 | 7/2003 | Bryer | |
| 2004/0008365 A1 | 1/2004 | Hobbs | |
| 2004/0114024 A1 | 6/2004 | Bouverie et al. | |
| 2004/0165927 A1 | 8/2004 | Fisher et al. | |
| 2005/0002715 A1 | 1/2005 | Fries et al. | |
| 2005/0189693 A1 | 9/2005 | Ko | |
| 2005/0190368 A1 | 9/2005 | Ehrhardt, Jr. et al. | |
| 2005/0204940 A1 | 9/2005 | Elliott et al. | |
| 2005/0271449 A1 * | 12/2005 | Hirte et al. | 400/642 |
| 2006/0007295 A1 | 1/2006 | Ueda | |
| 2006/0045601 A1 | 3/2006 | Endo | |
| 2006/0055721 A1 | 3/2006 | Burdette et al. | |
| 2006/0071393 A1 * | 4/2006 | Mizubata et al. | 271/10.01 |
| 2006/0157911 A1 | 7/2006 | Learmonth et al. | |
| 2006/0159504 A1 | 7/2006 | Blanchard, Jr. et al. | |
| 2006/0180737 A1 | 8/2006 | Consiglio | |
| 2006/0216098 A1 | 9/2006 | Lyman | |
| 2007/0022233 A1 | 1/2007 | Bridges et al. | |
| 2007/0040326 A1 | 2/2007 | Noda et al. | |
| 2007/0058220 A1 | 3/2007 | Sakakibara | |
| 2007/0059078 A1 | 3/2007 | Silverbrook et al. | |
| 2007/0063425 A1 * | 3/2007 | Tsujinishi | 271/145 |
| 2007/0138738 A1 | 6/2007 | Motohashi et al. | |
| 2009/0008860 A1 * | 1/2009 | Chen | 271/9.06 |
| 2009/0038495 A1 | 2/2009 | Butzen et al. | |
| 2009/0103806 A1 | 4/2009 | Nakami | |
| 2009/0244584 A1 | 10/2009 | McGarry et al. | |
| 2010/0066782 A1 | 3/2010 | Yamamoto et al. | |
| 2010/0080590 A1 * | 4/2010 | Takahashi | 399/45 |
| 2010/0169513 A1 | 7/2010 | Levin | |
| 2010/0247222 A1 | 9/2010 | Bouverie et al. | |
| 2010/0319561 A1 | 12/2010 | Colquitt et al. | |
| 2011/0042883 A1 | 2/2011 | Wang et al. | |
| 2011/0132643 A1 | 6/2011 | Hattori et al. | |
| 2011/0169215 A1 * | 7/2011 | Oh et al. | 271/227 |
| 2011/0298174 A1 * | 12/2011 | Wang | 271/226 |

FOREIGN PATENT DOCUMENTS

| | | | | |
|---|---|---|---|---|
| JP | 61203032 A * | 9/1986 | | G03G 15/00 |
| JP | 61203033 A * | 9/1986 | | G03G 15/00 |
| JP | 2001322723 A * | 11/2001 | | B65H 1/00 |
| JP | 2002370412 A * | 12/2002 | | B41J 11/00 |
| JP | 2005231887 A * | 9/2005 | | B65H 1/00 |
| JP | 2005320101 A * | 11/2005 | | B65H 16/08 |
| JP | 2007130933 A * | 5/2007 | | B66H 1/00 |
| JP | 2008132613 A * | 6/2008 | | B41J 11/42 |
| JP | 04552558 B2 | 9/2010 | | |

OTHER PUBLICATIONS

Written Opinion of the International Searching Authority, PCT/US2012/039043, Aug. 3, 2012.
Written Opinion of the International Searching Authority, PCT/US2012/041093, Aug. 7, 2012.
Written Opinion of the International Searching Authority, PCT/US2012/043734, Sep. 21, 2012.
Written Opinion of the International Searching Authority, PCT/US2012/043709, Sep. 21, 2012.

(56) References Cited

OTHER PUBLICATIONS

Written Opinion of the International Searching Authority, PCT/US2012/043772, Sep. 14, 2012.
Written Opinion of the International Searching Authority, PCT/US2012/046712, Oct. 5, 2012.
Written Opinion of the International Searching Authority, PCT/US2012/049417, Nov. 2, 2012.
Written Opinion of the International Searching Authority, PCT/US2012/050938, Nov. 6, 2012.
Written Opinion of the International Searching Authority, PCT/US2012/060956, Jan. 11, 2013.
Written Opinion of the International Searching Authority, PCT/US2012/066291, Feb. 5, 2013.
Supplementary European Search Report corresponding to European Application No. EP 12 78 9528, dated Nov. 14, 2014, 6 pages.

* cited by examiner

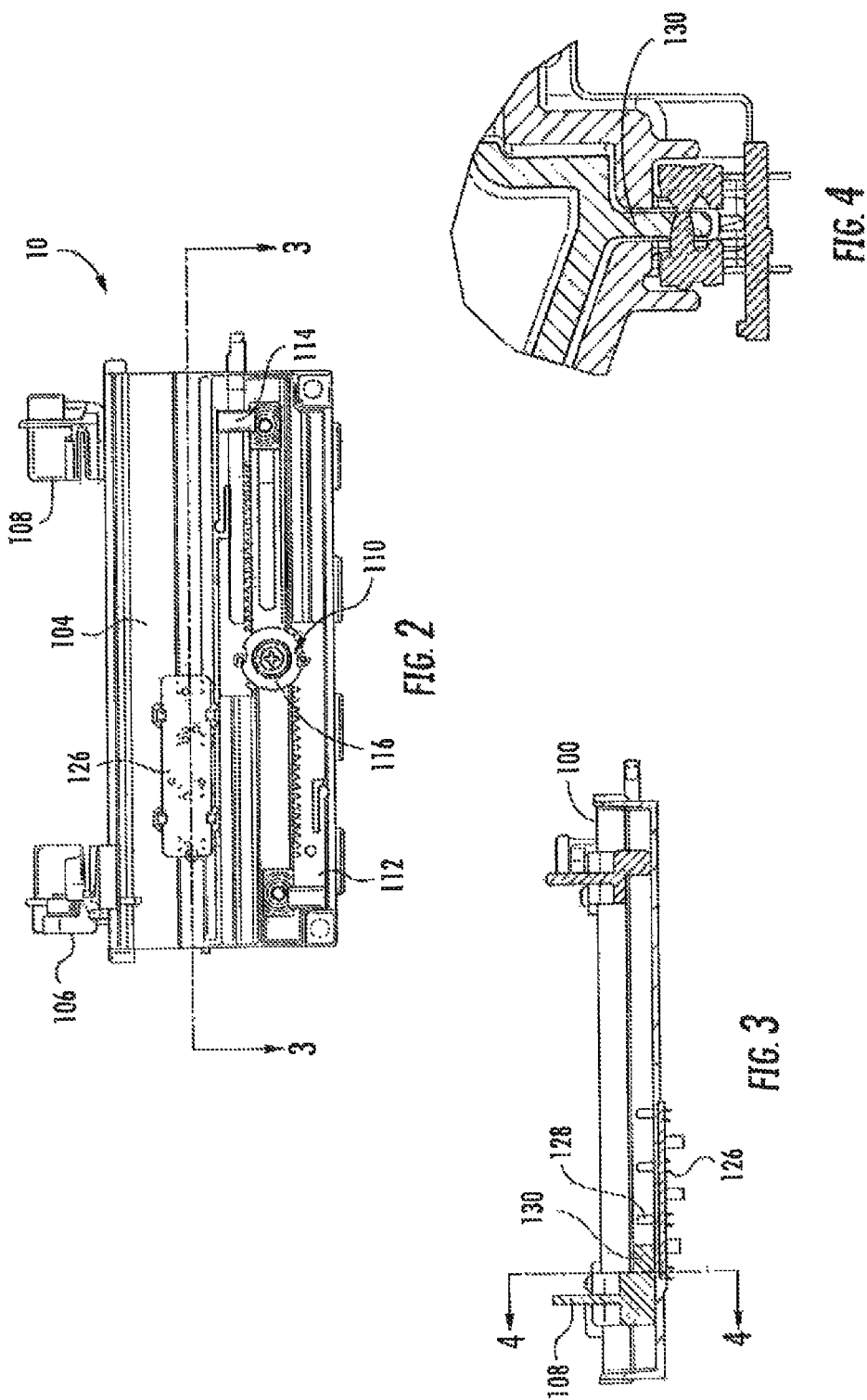

SENSING APPARATUS FOR DETECTING AND DETERMINING THE WIDTH OF MEDIA ALONG A FEED PATH

CROSS-REFERENCE TO RELATED APPLICATION(S)

This application claims priority to provisional patent application 61/488,890, filed May 23, 2011, and entitled "Media Width Sensor", the contents of which are incorporated in full by reference herein.

FIELD OF INVENTION

The present invention generally relates to the field of image forming apparatus and devices, and in particular, to sensors operable for determining the width of a media sheet or web as it moves along a media path within a print station of the image forming apparatus or device.

BACKGROUND

Printing systems such as copiers, printers, facsimile devices or other systems having a print engine for creating visual images, graphics, texts, etc. on a page or other printable medium typically include various media feeding systems for introducing original image media or printable media into the system. Examples include thermal transfer printers. Typically, a thermal transfer printer is a printer which prints on media by melting a coating of ribbon so that it stays glued to the media on which the print is applied. It contrasts with direct thermal printing where no ribbon is present in the process. Typically, thermal transfer printers comprise a supply spindle operable for supplying a media web and ribbon, a print station, and a take up spindle. New ribbon and media is fed from the supply spindle to the print station for printing and then the ribbon is wound up by the take up spindle while the media is exited from the print station. The media feed path typically includes media guide structures provided at predetermined locations operable for registering inserted media by moving one or both of the guides to engage opposite sides of the media, thereby fixing the location of the media relative to the path within the print system.

Conventional approaches for media width registration and identification include manual identification with no sensing means, wherein a user is prompted to input the media size and orientation. Heretofore, conventional approaches yield undesirable results. For instance, conventional approaches fail to provide for automatic adjustments in printhead pressure, ribbon supply and take up tension and rewinder tension due to variances in the media width. Further, conventional approaches fail to provide the printer with an ability to compare the width of the image to be printed with the actual media width. Such failures oftentimes lead to off center image printing, printing defects or printer failure. Indeed, should the media width not be accommodated for, wax (ink) may be undesirably deposited on the platen roller or firing elements on the printhead in free space may occur. One skilled in the art will appreciate that firing elements in free space may cause the elements to overheat and burn out.

Thus, there remains a need for improved media width sensing techniques and apparatus by which an automatic or semi-automatic determination of media width is provided and by which the need for width sensing system calibration can be managed. It would, therefore, be desirable to provide a sensing apparatus or device operable for detecting and determining the media width along a feed path of a printer. By detecting and determining the media width in the printer, automatic adjustments can be made to the printhead pressure, ribbon supply tension, ribbon supply take up, and rewind tension, thereby ensure a higher quality printed image and prolonger printer operation. Further, by detecting and determining the media width in the printer, associated software can compare the width of the image to be printed to the media width and notify the operator that they may be printing off the media.

SUMMARY OF THE INVENTION

The present invention is designed to overcome the deficiencies and shortcomings of the devices conventionally known and described above. The present invention is designed to reduce the manufacturing costs and the complexity of assembly. In all exemplary embodiments, the present invention is directed to sensing apparatus or sensors and methods of use to determine a width of a media sheet or web moving along a defined media path within a printing system. In an exemplary embodiment, a carriage or base is provided which is mountable within a printing system. A pair of adjustable media guides is provided and connected to the carriage via channels or slots which are located within a portion of the carriage. The media guides are configured to receive and maintain media or a web for printing and preferably axially spaced apart along the length of the carriage. Further, the media guides are configured and adapted such that they can be manipulated or moved along a horizontal axis of the carriage in a sliding manner. In exemplary embodiments, the sliding movement of the guides along the horizontal axis occurs in a synchronized manner. In still other exemplary embodiments, the guides are configured such that the center line of media which is passing along a media feed path is maintained along the centerline of the print station.

In all exemplary embodiments, a sensor is provided, affixed to the carriage and in signal communication with control circuitry of the printing system. The sensor is configured and operable for emitting at least one optical signal or light beam through at least one aperture located in the carriage. At least one of the media guides are provided with a tab or other obstruction which is configured and operable for protruding into at least a portion of the path of the at least one optical signal or light beam emitted from the sensor at defined locations, the defined locations corresponding to the widths of various media types used within the printing system. As the media guides move about the horizontal axis of the carriage, the tab may block or otherwise interrupt or obstruct the at least one optical signal or light beam, thereby reflecting the at least one optical signal or light beam back to the sensor and thuds signaling the sensor and the printer of the media's detection and width. By detecting and determining the media width in the printing station, automatic adjustments can be made to the printhead pressure, ribbon supply tension, ribbon supply take up, and rewind tension, thereby ensuring a higher quality printed image and prolonged printer operation. Further, by detecting and determining the media width in the printer station, associated software can compare the width of the image to be printed to the media width and notify the operator that they may be printing off the media.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

The present subject matter may take form in various components and arrangements of components, and in various steps and arrangements of steps. The appended drawings are only for purposes of illustrating exemplary embodiments and are not to be construed as limiting the subject matter.

FIG. 2 is a bottom plan view of the embodiment of FIG. 1;

FIG. 3 is a cross-sectional view of the embodiment of FIG. 1;

FIG. 4 is a cross-sectional view of the embodiment of FIG. 3 taken at line 4-4 showing the media guide in a fully expanded position;

DETAILED DESCRIPTION OF THE PREFERRED EMBODIMENT

Figure 1:
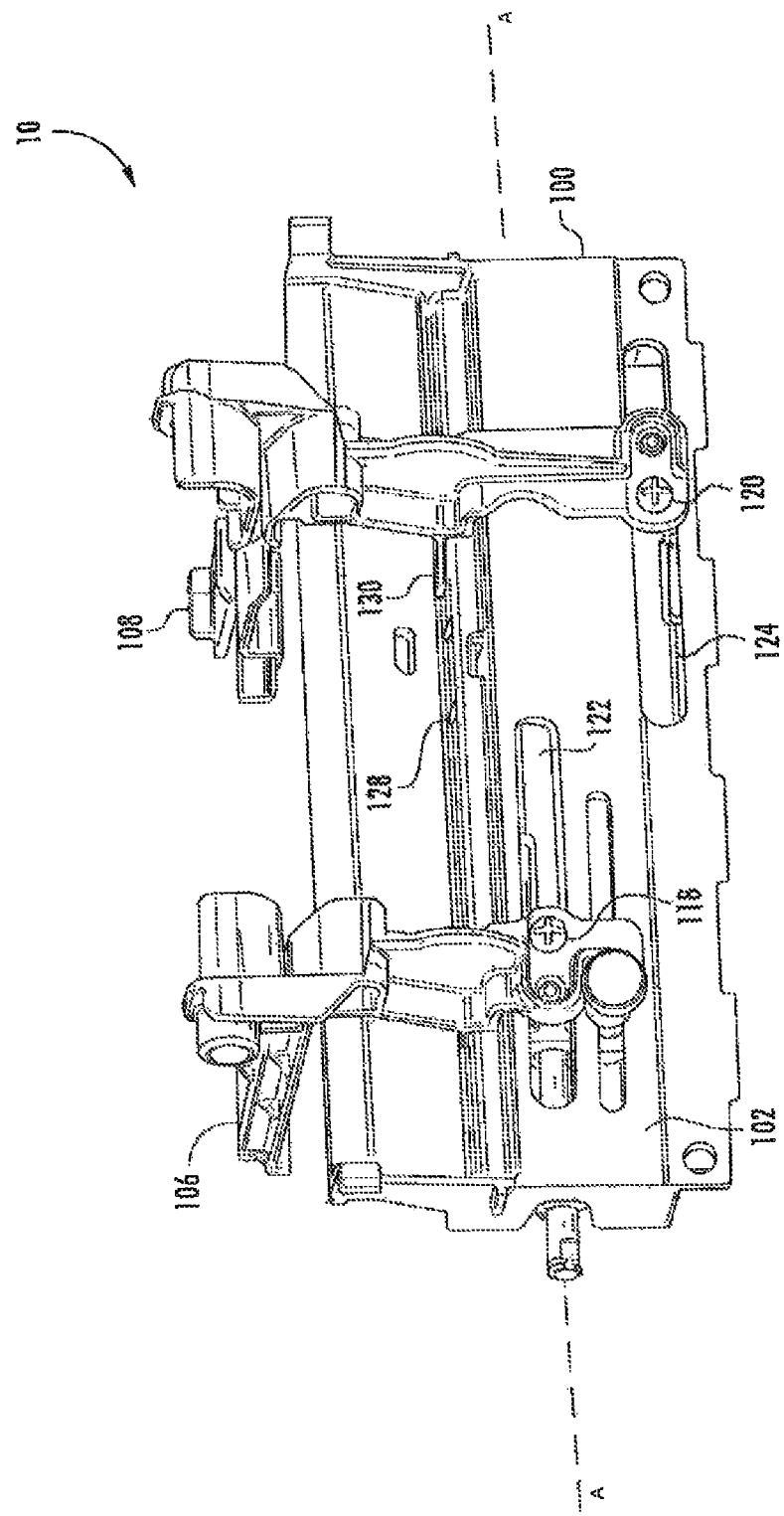
FIG. 1 is a perspective view of the media guides of the present invention in an open position.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Further, as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

Methods, apparatus and systems are presented herein for feeding original image media web and/or printable media into a printing system and for detecting the presence and determining the width of the inserted media at a print station location. In exemplary embodiments and as shown in FIGS. 1-7, a printing system media feeding apparatus 10 is provided, including a carriage or base 100 to support a media or web (not shown) being fed into the system 10, the base 100 having top and bottom surfaces 102 and 104, respectively. First and second media guides 106 and 108 are provided about the bottom surface 104 of the base 100 extending outward and about a side of the base 100. The guides 106, 108 are movably attached to the base 100 such that they are operable to engage opposite sides of the media being fed between the guides 106, 108.

In exemplary embodiments, both guides 106 and 108 are slidable along a horizontal axis (A-A) of the base 100 in synchronism via a rack and pinion system 110 and when pushed together, the guides 106, 108 centrally register the inserted media and help ascertain the width thereof. More specifically, the guides 106 and 108 are mounted to first and second racks 112, 114 and coupled by a pinion gear 116 on the top surface 102 of the base 100 that cooperatively provide for synchronous translation of the guides 106, 108 in a rack and pinion arrangement by which the guides 106, 108 can be pushed together to centrally register the media. In exemplary embodiments, the rack and pinion system 110 is located about the top surface 102 of the base 100 and is connected to the guides 106, 108 via screws 118, 120 that extend through the base 100 at predefined channels or slots 122, 124.

The printing system 10 further includes a media sensing apparatus or sensor 126 configured for emitting signals used to ascertain the presence and width of registered media between the media guides 106 and 108. It will be understood by those skilled in the art that the signals emitted by the sensor 126 may be either optical or electrical signals. In exemplary embodiments, the sensor 126 is mounted in a fixed position relative to the top surface 102 of the base 100 and the guides 106 and 108. The sensor 126 is adapted to detect the presence and/or absence of an obstruction and is in signal communication with control circuitry (not shown) of the printing system 10. In exemplary embodiments, the control circuitry determines the width of the media based on signals received from the sensor 126. In one example embodiment, the control circuitry includes a microcontroller with associated memory. The control circuitry may oversee movement of the media sheet along the entire media feed path of the printer, or may just determine the width of the media as it moves through the print station and about the sensor 126.

In exemplary embodiments, the sensor 126 may be an optical sensor, a photosensor, a mechanical sensor, or another suitable sensor as known in the art. In exemplary embodiments shown herein, the sensor 126 is an optical sensor. The sensor 126 is provided with at least one light emitting device which is operable for emitting at least one light beam along a first light path through at least one aperture 128 of the base 100. The sensor 126 is also operable for detecting a reflected light beam along a second light path that is generated by an obstruction and includes a transmitter (not shown) and a receiver (not shown). In example embodiments, the transmitter emits a signal that is detectable by receiver. In one exemplary embodiment, the signal is electromagnetic energy. Thus, the transmitter emits optical energy with a frequency spectrum that is detectable by the receiver. It will be appreciated by those skilled in the art that the transmitter may be embodied as an light emitting diode (LED), laser, bulb or other source. In exemplary embodiments, the receiver changes operating characteristics based on the presence and quantity of optical energy received. It will be appreciated by those skilled in the art that the receiver may be a phototransistor, photodarlington, or other detector. The optical energy may consist of visible light or near-visible energy (e.g., infrared or ultraviolet).

In exemplary embodiments, the sensor 126 may include an optical emitter or laser module communicably linked to a microcontroller or the control circuitry of the printer. The sensor 126 may be configured to emit an optical signal or beam along a first optical path and receive a reflected optical signal reflected from an obstruction along a second optical path. The sensor 126 may also include a transceiver (not shown). In exemplary embodiments, the transceiver may include an integrated avalanche photodiode (APD) receiver, as APD receivers are particularly well suited for detecting small amounts of light. The transceiver may be configured to receive reflected optical signals and convert them, into electrical signals which may then be transmitted to the control circuitry for a determination of the media's width and subsequent adjustments to the printing operation.

In other exemplary embodiments, the sensor 126 is a photo-sensor constituted by a light emitting element that emits light using a light emitting diode (LED) and a light receiving element that receives reflection light reflected from an obstruction and which outputs a voltage on the basis of intensity of the received light. In exemplary embodiments, the sensor 126 is a reflection-type photo interrupter that receives light, which has been emitted from the light emitting element, reflected from an obstruction using the light receiving element and changes its output voltage level in correspondence with the intensity of the received. The output voltage level of the sensor 126 for a case where light reflected from the obstruction at one location is received is higher than that for a case where light reflected from the obstruction at a different location is received. Accordingly, when an approximate center output voltage level is set as a reference voltage, the width of the media may be determined based upon the output voltage level.

The presence or absence of an obstruction, as determined by the sensor 126, influences functions of the printing system 10 according to programming within the control circuitry. By detecting and determining the media width in the printing station, automatic adjustments can be made to the printhead pressure, ribbon supply tension, ribbon supply take up, and rewind tension, thereby ensuring a higher quality printed image and prolonged printer operation. Further, by detecting and determining the media width in the printer station, associated software can compare the width of the image to be printed to the media width and notify the operator that they may be printing off the media. The sensor 126 may be used with roll media, although use of the sensor in conjunction with media of other types is also contemplated. Also, in exemplary embodiments, the media width resolution of the sensor 126 is determined by:

$$Res=(Max.\ media\ width-Min.\ media\ width)/(2*N-1),$$

where N is the number light beams emitted by the sensor.

In all exemplary embodiments, at least one of the media guides 106, 108 include an optical obstruction structure (a tab) 130 that is operatively coupled to the movable media guide so as to move relative to the at least one light beam emitted by the sensor 126 when the guide is moved relative to the base 100 with the tab 130 moving within a sensing gap (over the emitted light beam coming through the aperture) to block or otherwise interrupt the signal path.

Figure 5:
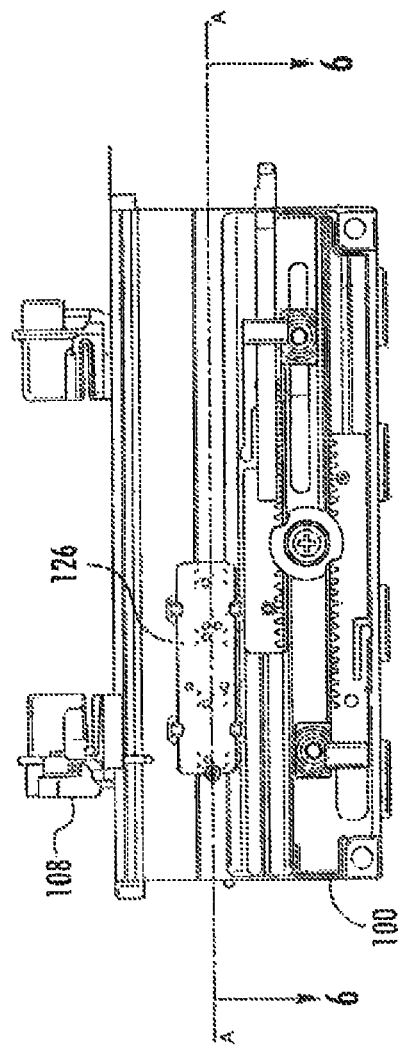
FIG. 5 is a bottom plan view of the embodiment of FIG. 1 with the media guides moved inward along the horizontal axis such that a light beam emitted from the sensor is interrupted.
Figure 7:
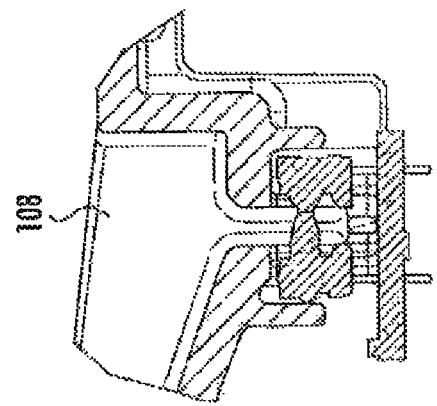
FIG. 7 is a cross-sectional view of the embodiment of FIG. 6 taken at line 7-7 showing the media guide in a partially closed position.
Figure 6:
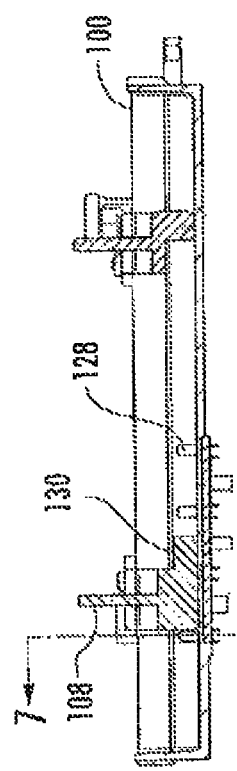
FIG. 6 is a cross-sectional view of the embodiment of FIG. 1.

FIGS. 1-4 illustrate the media guides 106, 108 in a fully opened position such that none of the light beams emitted by the sensor 126 are blocked or otherwise obstructed. Referring now to FIG. 5, the media guides 106, 108 are moved inward along the horizontal A-A axis of the base 100 to a predefined location such that tab 130 blocks at least one of the light beams emitted from sensor 126. Upon further closure of the media guides 106, 108 to another predefined location additional light beams will be blocked, thereby providing the control circuitry with additional information to be used in the determination of the media width. Alternatively, in a photo sensor embodiment, as the reflected light is returned the photo sensor can determine the width of the media and signal the control circuitry of the printer.

Further exemplary embodiments provide a method for detecting and determining a media width in a printing system. The method comprises providing a base or carriage 100 with first and second media guides 106, 108, mounting a sensor 126 in a fixed position relative to the print station. The base 100 within the print station being provided with at least one aperture for permitting emitted optical signals or light beams from the sensor to pass through. At least one media guide is provided with an optical obstruction structure such as a tab or fin which is located in a fixed position relative to the media guide to move relative to the emitted light beam when the media guide is moved relative to the print station. The media guide is then moved to register the media and reflected optical signals are read from the sensor, with the media width being determined based at least partially on the reflected optical signals. In certain implementations, the width determination may include determining two or more possible media widths based on the electrical output signals from the sensor, rendering a selection of the plurality of possible media widths to a user, and determining the media width based on a user selection from a user interface of the printing system.

The above described examples, moreover, may be employed in calibrated or non-calibrated systems for determining media widths and for registering media being fed into a printing system. Furthermore, while the illustrated examples are described in connection with media feeding systems employing two oppositely adjustable synchronously translating rack and pinion type guide assemblies, other embodiments are possible in which one guide is stationary while the other is translatable.

The embodiments described above provide advantages over conventional devices and associated methods of manufacture. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Furthermore, the foregoing description of the preferred embodiment of the invention and best mode for practicing the invention are provided for the purpose of illustration only and not for the purpose of limitation—the invention being defined by the claims.

What is claimed is:

1. A system to determine a width of media along a media feed path of a printing system, comprising:
   a pair of adjustable media guides connected about a first side of a base, the media guides being axially spaced apart along a length of the base and being configured to be manipulated along a horizontal axis of the base in a sliding and synchronized manner;
   a sensor affixed to the base, the sensor being in signal communication with control circuitry of the printing system and being configured for emitting at least one optical signal through at least one aperture located in the base; and
   a rack and pinion system configured to drive the media guides, the rack and pinion system disposed on a second side of the base different from the first side of the base and connected to the media guides through the base,
   wherein at least one of the media guides is provided with an obstruction, the obstruction configured to block the at least one aperture of the base when the at least one of the media guides is at a predefined location, wherein the obstruction reflects the at least one optical signal emitted by the sensor and includes a first portion that provides a first reflected optical signal having a first intensity and a second portion that provides a second reflected optical signal having a second intensity, the first intensity is different than the second intensity, and wherein the printing system determines the media's width based on whether the sensor receives the first reflected optical signal or the second reflected optical signal.

2. The system of claim 1, the sensor is selected from the group consisting of an optical sensor, a mechanical sensor, and a photo sensor.

3. The system of claim 1, wherein the media guides are connected to the base through slots located at predefined locations within the base.

4. The system of claim 1, wherein the sensor comprises a transmitter having a light emitting diode operable for emitting the at least one optical signal and a receiver operable for receiving a reflected optical signal and converting the reflected optical signal into an electrical signal which can be transmitted by the transmitter to the control circuitry.

5. The system of claim 1, wherein the optical signal is a light beam.

6. The system of claim 1, wherein the obstruction is a tab.

7. The system of claim 1, wherein the media guides are further configured to maintain a centerline of the media which is passing along the media feed path along the centerline of the print system.

8. The system of claim 1, wherein the media guides are positioned and connected to the base at a predefined distance apart such that they can engage opposite ends of the media.

9. An apparatus for detecting presence of a media and determining a width of the media within a media feed path of a printing system, comprising:
   a carriage being operable to support the media;
   a pair of adjustable media guides connected about the carriage, the media guides being axially spaced apart along a length of the carriage and being configured to be manipulated along a horizontal axis of the carriage in a sliding and synchronized manner;
   a sensor affixed to the carriage, the sensor being in signal communication with control circuitry of the printing system and being configured for emitting at least one optical signal through at least one aperture located in the carriage; and
   a rack and pinion system configured to drive the media guides, the rack and pinion system disposed on a first side of the carriage and connected to the media guides through the carriage;
   wherein at least one of the media guides is provided with an obstruction, the obstruction is transitionable between a first position in which the at least one optical signal is emitted through the at least one aperture of the carriage and a second position in which the obstruction blocks the at least one aperture of the carriage when the at least one of the media guides is at a predefined location,
   wherein the obstruction reflects the at least one optical signal emitted by the sensor and includes a first portion that provides a first reflected optical signal having a first intensity and a second portion that provides a second reflected optical signal having a second intensity, the first intensity is different than the second intensity, and
   wherein the printing system determines the media's width based on whether the sensor receives the first reflected optical signal or the second reflected optical signal.

10. The apparatus of 9, the sensor is selected from the group consisting of an optical sensor, a mechanical sensor, and a photo sensor.

11. The apparatus of 9, wherein the media guides are connected to the carriage through slots located at predefined locations within the carriage.

12. The apparatus of 9, wherein the sensor comprises a transmitter having a light emitting diode operable for emitting the at least one optical signal and a receiver operable for receiving a reflected optical signal and converting the reflected optical signal into an electrical signal which can be transmitted by the transmitter to the control circuitry.

13. The apparatus of claim 12, wherein the receiver is an integrated avalanche photodiode receiver.

14. The apparatus of 9, wherein the optical signal is a light beam.

15. The apparatus of 9, wherein the obstruction is a tab.

16. The apparatus of 9, wherein the media guides are further configured to maintain a centerline of the media which is passing along the media feed path along the centerline of the print station.

17. The apparatus of 9, wherein the media guides are positioned and connected to the carriage at a predefined distance apart such that they can engage opposite ends of the media.

18. A sensing apparatus for detecting presence of a media and determining a width of the media within a media feed path of a printing system, comprising:
   a carriage being operable to support the media;
   a first adjustable media guide and a second fixed media guide connected about the carriage, the first adjustable and second fixed media guides being axially spaced apart along a length of the carriage and being configured such that the first adjustable media guide can be manipulated along a horizontal axis of the carriage in a translatable manner in relation to the second fixed media guide;
   a sensor affixed to the carriage, the sensor being in signal communication with control circuitry of the printing system and being configured for emitting at least one optical signal through at least one aperture located in the carriage; and
   a rack and pinion system configured to drive the first adjustable and second fixed media guides, the rack and pinion system is disposed on a first side of the carriage and connected to the first adjustable and second fixed media guides through the carriage,
   wherein the first adjustable media guide is provided with an obstruction, the obstruction configured to block the at least one aperture of the carriage when the first adjustable media guide is at a predefined location,
   wherein the obstruction reflects the at least one optical signal emitted by the sensor and includes a first portion that provides a first reflected optical signal having a first intensity and a second portion that provides a second reflected optical signal having a second intensity, the first intensity is different than the second intensity, and
   wherein the printing system determines the media's width based on whether the sensor receives the first reflected optical signal or the second reflected optical signal.

* * * * *